United States Patent
Yabe et al.

(10) Patent No.: US 7,854,989 B2
(45) Date of Patent: Dec. 21, 2010

(54) COVERING SHEET AND WIRE HARNESS

(75) Inventors: Kazuyoshi Yabe, Kosai (JP); Atsushi Sugiyama, Susono (JP)

(73) Assignee: Yazaki Corporation, Tokyo (JP)

( * ) Notice: Subject to any disclaimer, the term of this patent is extended or adjusted under 35 U.S.C. 154(b) by 410 days.

(21) Appl. No.: 11/580,951

(22) Filed: Oct. 16, 2006

(65) Prior Publication Data

US 2007/0104927 A1  May 10, 2007

(30) Foreign Application Priority Data

Nov. 7, 2005 (JP) .......................... P2005-321766

(51) Int. Cl.
*B32B 7/12* (2006.01)
*B32B 3/14* (2006.01)
*B32B 23/02* (2006.01)

(52) U.S. Cl. .................. 428/343; 428/77; 428/81; 428/98; 428/99; 428/102; 428/192

(58) Field of Classification Search ................ 428/42.1, 428/77, 81, 98, 99, 102, 192, 343
See application file for complete search history.

(56) References Cited

U.S. PATENT DOCUMENTS

| | | | | |
|---|---|---|---|---|
| 4,584,217 A | * | 4/1986 | McClintock | 428/41.8 |
| 4,770,913 A | * | 9/1988 | Yamamoto | 428/41.9 |
| 4,994,300 A | * | 2/1991 | Itou et al. | 427/511 |
| 5,021,611 A | * | 6/1991 | Amano | 174/88 R |
| 5,180,885 A | | 1/1993 | Shah | |

FOREIGN PATENT DOCUMENTS

| | | |
|---|---|---|
| DE | 723634 | 8/1942 |
| DE | 19740722 A1 | 3/1999 |
| DE | 10229527 A1 | 1/2004 |
| DE | 10036805 | 6/2005 |
| JP | 58-81990 U | 6/1983 |
| JP | 09107614 A * | 4/1997 |

* cited by examiner

*Primary Examiner*—Patricia L Nordmeyer
(74) *Attorney, Agent, or Firm*—Sughrue Mion, PLLC

(57) ABSTRACT

A covering sheet for being wound on a sheathed wire, includes a base sheet that has a strip shape, and an adhesive tape that has an adhesive surface formed only on one side thereof. The adhesive tape is bonded to the base sheet so as to project from one side edge portion of the base sheet.

4 Claims, 5 Drawing Sheets

COVERING SHEET AND WIRE HARNESS

BACKGROUND OF THE INVENTION

This invention relates to a covering sheet used for combining a plurality of sheathed wires into a bundle in a manner to protect these sheathed wires, and the invention also relates to a wire harness.

For protecting a plurality of sheathed wires simultaneously when combining these sheathed wires into a bundle, there is used, for example, a sheathed wire-covering sheet having a sheet-like construction.

One example of this related sheathed wire-covering sheet comprises a base sheet, and an adhesive double coated tape bonded to one side edge portion of the base sheet. In use, the base sheet is rolled in its widthwise direction into a tubular shape, with the adhesive double coated tape surface disposed outwardly, and embraces a plurality of sheathed wires bundled together, and the superposed opposite side edge portions of the base sheet are fixed to each other by bonding the adhesive double coated tape surface to an inner surface of the base sheet (see, for example, JP-UM-A-58-81990 (Page 1, FIG. 1)).

In another example of the related sheathed wire-covering sheet, an adhesive is coated directly on one edge portion of the base sheet instead of using the adhesive double coated tape. A method of using this sheathed wire-covering sheet is generally the same as described above for the former sheathed wire-covering sheet.

The above related sheathed wire-covering sheets have the following problems.

In the former sheathed wire-covering sheet employing the adhesive double coated tape, the cost of production of this adhesive double coated tape is rather high, and this has increased the production cost of the sheathed wire-covering sheet.

In the latter sheathed wire-covering sheet having the adhesive coated thereon, a large-scale process is required for coating the adhesive, and therefore the productivity is not good, and this has also increased the production cost of the sheathed wire-covering sheet as is the case with the former sheathed wire-covering sheet.

SUMMARY OF THE INVENTION

Therefore, this invention has been made in view of the above circumstances, and an object of the invention is to provide a covering sheet and a wire harness which can solve the above problems.

In order to achieve the above object, according to the present invention, there is provided a covering sheet for being wound on a sheathed wire, comprising:

a base sheet that has a strip shape; and an adhesive tape that has an adhesive surface formed only on one side thereof, wherein the adhesive tape is bonded to the base sheet so as to project from one side edge portion of the base sheet.

Preferably, the adhesive tape is smaller in width than the base sheet.

The adhesive tape is bonded to the base sheet so as to project a predetermined amount from the one side edge portion of the base sheet.

Preferably, a plurality of the adhesive tape, each of which is smaller in width than the base sheet. The adhesive tapes are bonded to the base sheet so as to project a predetermined amount respectively from the opposite side edge portions of the base sheet.

Preferably, the adhesive tape is greater in width than the base sheet. The adhesive tape is bonded to the base sheet so as to project a predetermined amount from one side edge portion or both of the opposite side edge portions of the base sheet.

According to the present invention, there is also provided a wire harness, comprising:

the covering sheet as defined in claim 1; and a bundle of sheathed wires around which the covering sheet is wound.

The sheathed wire-covering sheet of the present invention employs the adhesive tape which can be produced at a low cost, and has the adhesive surface formed only on one side thereof. The adhesive tape is bonded to the strip-like base sheet, and projects from the side edge portion of the base sheet extending in the longitudinal direction of this base sheet. With this construction, the sheathed wire-covering sheet can be easily produced, and besides the production cost of the sheathed wire-covering sheet can be reduced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Preferred embodiments of sheathed wire-covering sheets of the present invention will now be described. Sheathed wires, illustrated in the preferred embodiments of the invention, are used in a vehicle, and the sheathed wires, having the sheathed wire-covering sheet of the invention wound therearound, form a wire harness.

First Embodiment

Figure 1:
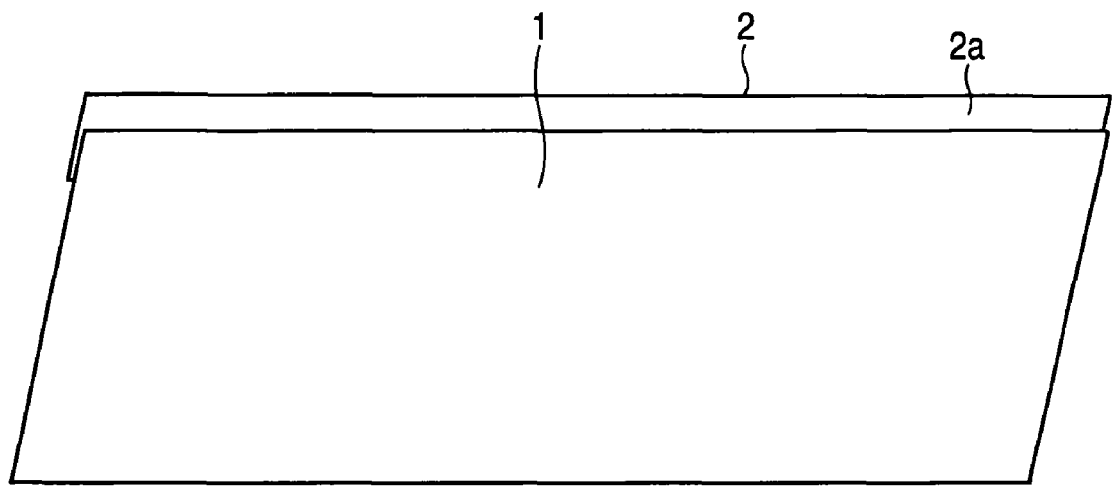
FIG. 1 is a perspective view of a first embodiment of a sheathed wire-covering sheet of the present invention.

As shown in FIG. 1, a sheathed wire-covering sheet of a first embodiment comprises a strip-like (or band-like) base sheet 1 made of a synthetic resin, and an adhesive tape 2 which has an adhesive surface 2a formed only on one side thereof, and is smaller in width than the base sheet 1. The adhesive tape 2 is bonded to the base sheet 1, and projects a predetermined amount from one side edge portion of the base sheet 1.

Figure 2:
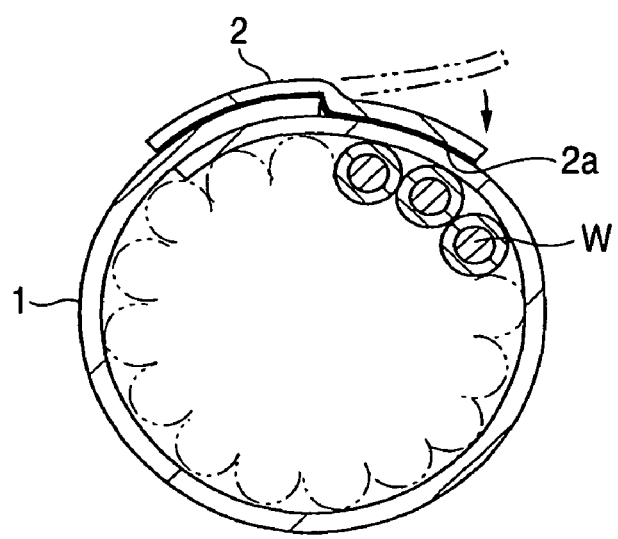
FIG. 2 is a transverse cross-sectional view showing a condition in which the sheathed wire-covering sheet of the first embodiment is used.

As shown in FIG. 2, the base sheet 1 of the sheathed wire-covering sheet of this construction is rolled in its widthwise direction into a tubular shape, with the adhesive surface 2a disposed inwardly, and embraces or encloses a plurality of sheathed wires W bundled together, and the superposed opposite side edge portions of the base sheet 1 are fixed to each other by bonding the adhesive surface 2a to an outer surface of the base sheet 1.

In this first embodiment, the base sheet 1 is rolled in its widthwise direction into a tubular shape with the adhesive surface 2a disposed inwardly. However, in contrast, the base sheet 1 can be rolled in its widthwise direction with the adhesive surface 2a disposed outwardly, in which case the adhesive surface 2a is bonded to an inner surface of the base sheet 1.

Second Embodiment

Figure 3:
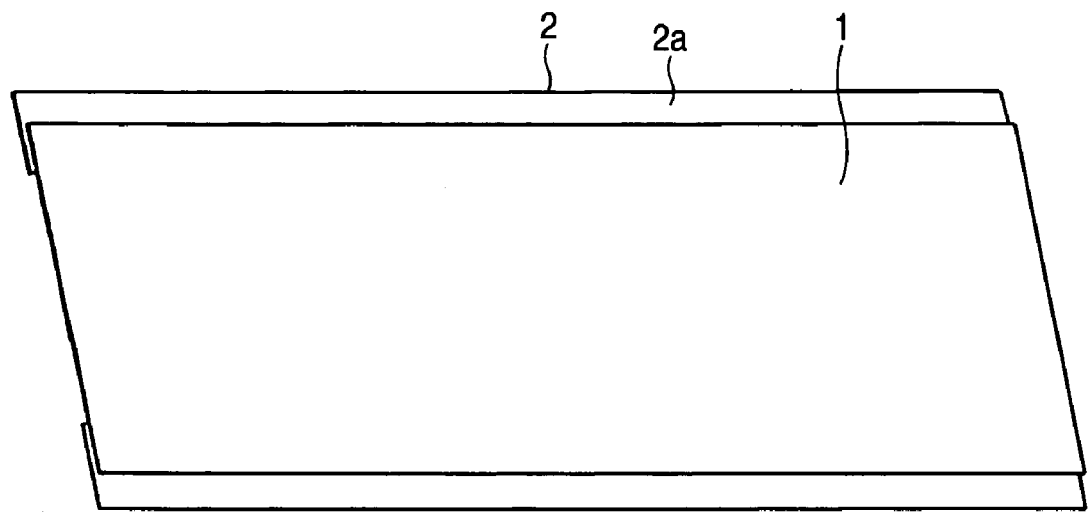
FIG. 3 is a perspective view of a second embodiment of a sheathed wire-covering sheet of the invention.
Figure 4:
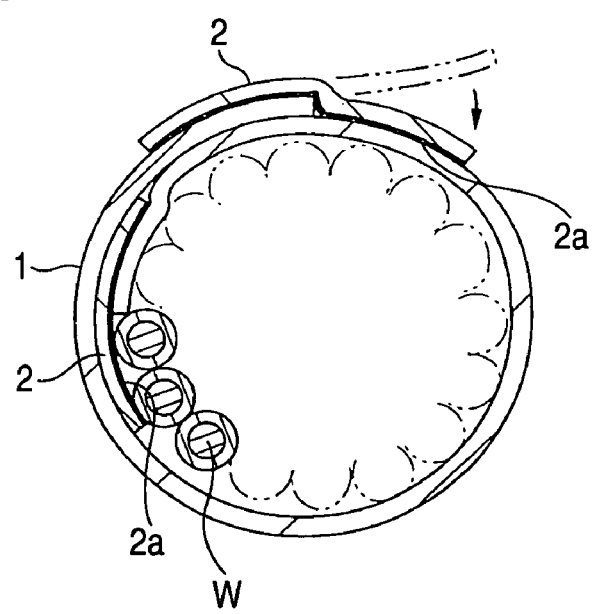
FIG. 4 is a transverse cross-sectional view showing a condition in which the sheathed wire-covering sheet of the second embodiment is used.

As shown in FIG. 3, a sheathed wire-covering sheet of a second embodiment comprises a strip-like base sheet 1 made of a synthetic resin, and a pair of narrow adhesive tapes 2 (similar to the adhesive tape 2 of the first embodiment) which are bonded only to one side (or face) of the base sheet 1, and project a predetermined amount respectively from opposite side edge portions of the base sheet 1.

In use, the base sheet 1 and sheathed wires W are arranged in such a manner that longitudinal axes of adhesive surfaces 2a of the two adhesive tapes 2 are disposed parallel to longitudinal axes of the sheathed wires W, and then one of the adhesive surfaces 2a is bonded to the sheathed wires W, and then the base sheet 1 is rolled in its widthwise direction into a tubular shape, and embraces the plurality of sheathed wires W bundled together, and the superposed opposite side edge portions of the base sheet 1 are fixed to each other by bonding the other adhesive surface 2a to an outer surface of the base sheet 1.

Figure 5:
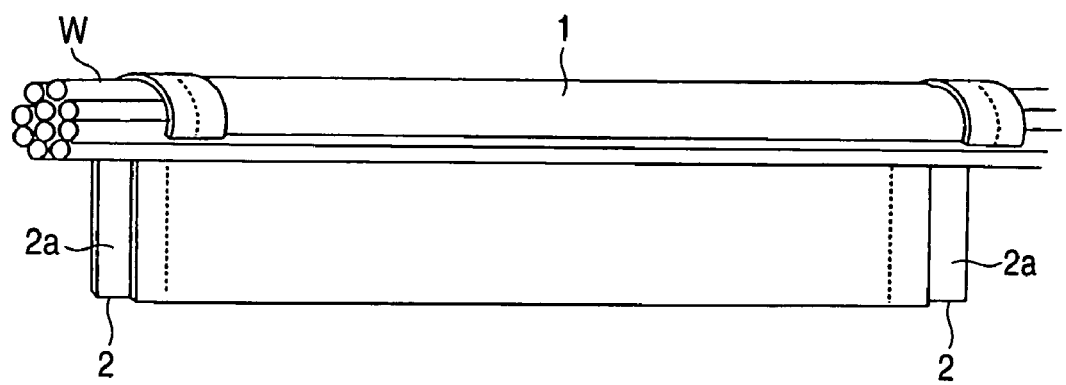
FIG. 5 is a perspective view showing a condition in which the sheathed wire-covering sheet of the second embodiment is used in another way.

In the above example, the base sheet 1 and the sheathed wires W are arranged in such a manner that the longitudinal axes of the adhesive surfaces 2a are disposed parallel to the longitudinal axes of the sheathed wires W, and the base sheet 1 is wound around the sheathed wires W to embrace them. However, the base sheet 1 can be rolled into a tubular shape, with the longitudinal axes of the two adhesive surfaces 2a disposed perpendicular to the longitudinal axes of the sheathed wires W, so that the superposed opposite end portions of the base sheet 1 can be fixed to each other by bonding the adhesive surfaces 2a to the outer surface of the base sheet 1, as shown in FIG. 5.

Third Embodiment

Figure 6:
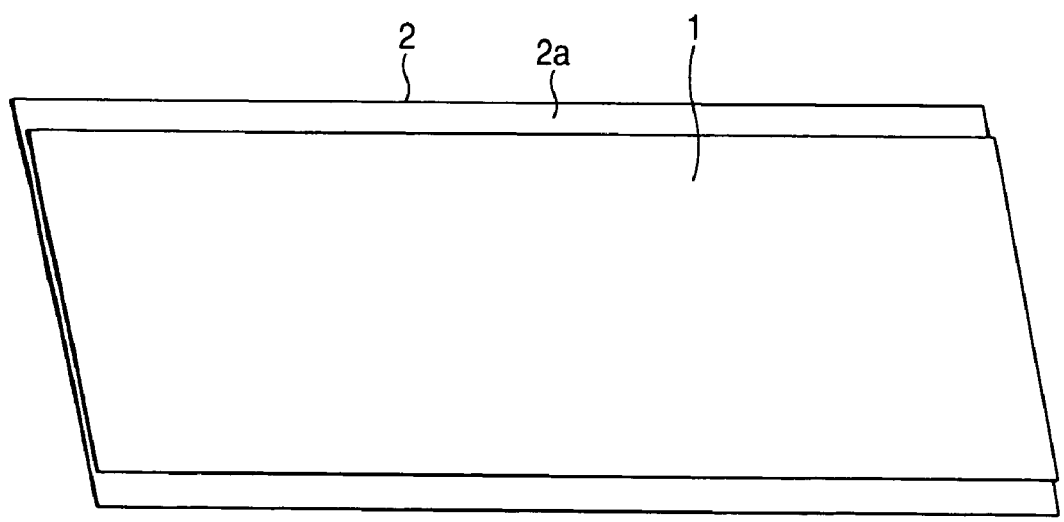
FIG. 6 is a perspective view of a third embodiment of a sheathed wire-covering sheet of the invention.

As shown in FIG. 6, a sheathed wire-covering sheet of a third embodiment comprises a strip-like base sheet 1 made of a synthetic resin, and an adhesive tape 2 which is larger in width than the base sheet 1, and is bonded to one side (or face) of the base sheet 1 in such a manner that opposite side edge portions of this adhesive tape 2 project a predetermined amount respectively from opposite side edge portions of the base sheet 1.

In use, the base sheet 1 and sheathed wires W are arranged in such a manner that longitudinal axes of two (exposed) adhesive surfaces 2a of the adhesive tape 2 are disposed parallel to longitudinal axes of the sheathed wires W, and then one of the two adhesive surface 2a is bonded to the sheathed wires W, and then the base sheet 1 is rolled in its widthwise direction into a tubular shape, and embraces the plurality of sheathed wires W bundled together, and the superposed opposite side edge portions of the base sheet 1 are fixed to each other by bonding the other adhesive surface 2a to an outer surface of the base sheet 1.

In this example, also, the base sheet 1 can be rolled into a tubular shape, with the longitudinal axes of the two adhesive surfaces 2a disposed perpendicular to the longitudinal axes of the sheathed wires W, so that the superposed opposite end portions of the base sheet 1 can be fixed to each other by bonding the adhesive surfaces 2a to the outer surface of the base sheet 1, as described above for the second embodiment.

In a modified form of the invention, an adhesive tape 2 which is larger in width than the base sheet 1 is bonded to the base sheet 1, and projects a predetermined amount from one side edge portion of the base sheet 1.

In this case, a longitudinal axis of an adhesive surface 2a is disposed parallel to the longitudinal axes of the sheathed wires W, and in this condition the base sheet 1 is rolled in its widthwise direction into a tubular shape, with the adhesive surface 2a disposed inwardly, and embraces the plurality of sheathed wires W bundled together, and the superposed opposite side edge portions of the base sheet 1 are fixed to each other by bonding the adhesive surface 2a to an outer surface of the base sheet 1, as described above for FIG. 2.

Fourth Embodiment

Figure 7:
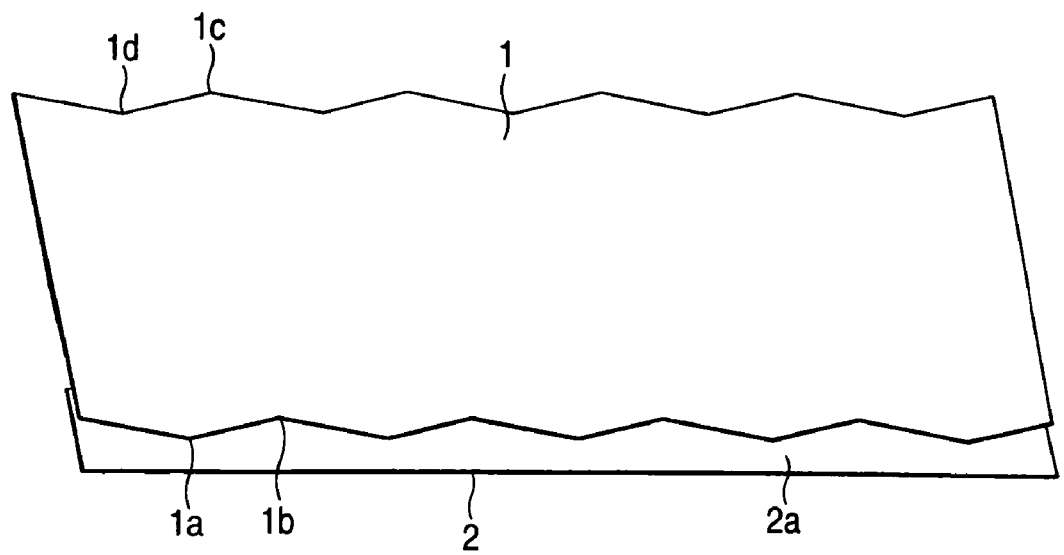
FIG. 7 is a perspective view of a fourth embodiment of a sheathed wire-covering sheet of the invention.

In a sheathed wire-covering sheet of a fourth embodiment as shown in FIG. 7, first mountain portions 1a and first valley portions 1b (each of which is defined by two slanting edges) are alternately formed at a predetermined pitch in a continuous manner at one side edge portion of a base sheet 1, while second mountain portions 1c and second valley portions 1d (each of which is defined by two slanting edges) are alternately formed in a continuous manner at the other side edge portion of the base sheet 1 at the same pitch as the pitch of the first mountain portions 1a and first valley portions 1b such that the second mountain portions 1c correspond respectively to the first valley portions 1b in a direction of the width of the base sheet 1, while the second valley portions 1d correspond respectively to the first mountain portions 1a. The first mountain portions 1a, the first valley portions 1b, the second mountain portions 1c and the second valley portions 1d serve as a registration unit (which comprises an alignment portion). An adhesive tape (or tapes) 2 is bonded to the base sheet 1 as described above for the first to third embodiments. In the illustrated embodiment of FIG. 7, the narrow adhesive tape 2 is bonded only to one side (or face) of the base sheet 1, and projects a predetermined amount from one side edge portion of the base sheet 1.

In the sheathed wire-covering sheet of this construction shown in FIG. 7, a longitudinal axis of an adhesive surface 2a of the adhesive tape 2 is disposed parallel to longitudinal axes of sheathed wires W, and in this condition the base sheet 1 is rolled in its widthwise direction into a tubular shape with the adhesive surface 2a disposed outwardly, while using the corresponding mountain portions and valley portions (that is, the mating first mountain portions 1a and second valley portions 1d and the mating second mountain portions 1c and first valley portions 1b) at the opposite side edge portions of the base sheet 1 as a guide unit, and the thus rolled base sheet 1 embraces the plurality of sheathed wires W bundled together, and the superposed opposite side edge portions of the base sheet 1 are fixed to each other by bonding the adhesive surface 2a to an inner surface of the base sheet 1.

In the sheathed wire-covering sheet of the fourth embodiment, the base sheet 1 is rolled in its widthwise direction into a tubular shape, using the mountain portions and valley portions at the opposite side edge portions thereof as the registration unit, that is, in such a manner that the mountain portions at each side edge portion of the base sheet 1 are brought into registry with the corresponding valley portions at the opposite side edge portion thereof, and by doing so, the opposite side edge portions of the base sheet 1 can be easily brought into registry with each other.

Figure 8:
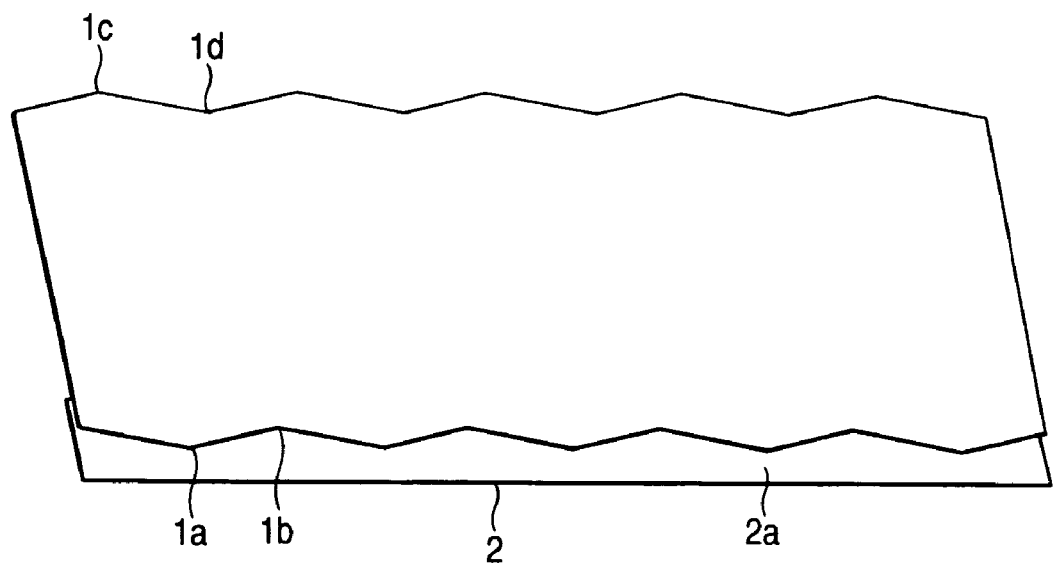
FIG. 8 is a perspective view showing a modified sheathed wire-covering sheet of the invention.

In a modified form of the invention shown in FIG. 8, first mountain portions 1a correspond respectively to second mountain portions 1c, while first valley portions 1b correspond respectively to second valley portions 1d, thus assuming a generally multi-rhombic configuration as a whole. Mountain portions and valley portions may be formed at the adhesive tape (or tapes) 2, but in view of the production cost, it is preferred to form the mountain portions and the valley portions at the base sheet 1 as described above.

In this embodiment, although the mountain portions and the valley portions are alternately formed in a continuous manner at each of the opposite side edge portions of the base sheet 1, the invention is not limited to this construction. For example, one mountain portion and one valley portion can be formed at each of the opposite side edge portions of the base sheet 1, or mountain portions and valley portions may be alternately formed at intervals, that is, in a discontinuous manner.

Figure 9:
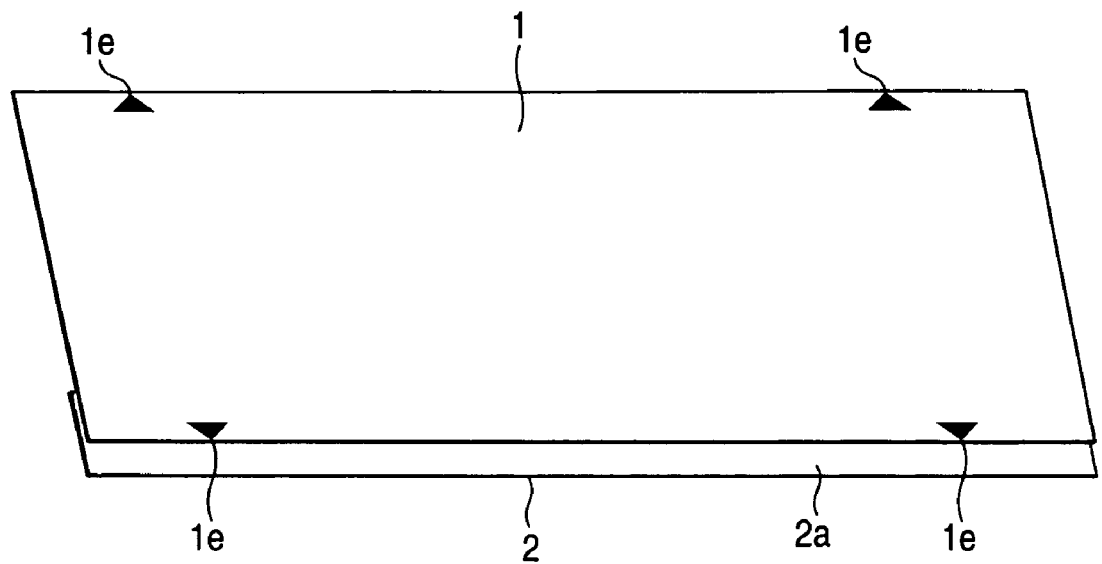
FIG. 9 is a perspective view of another modified sheathed wire-covering sheet of the invention.

FIG. 9 shows another modified form of the invention in which instead of forming the mountain portions and the valley portions (registration units) at each of the opposite side edge portions of the base sheet 1, marks 1e serving as registration units are formed at each of opposite side edge portions of a base sheet 1, and are spaced a predetermined distance from each other.

As described above, the sheathed wire-covering sheets of the above embodiments can be produced at a low cost. The adhesive tape (or tapes) 2, having the adhesive surface 2a formed only on one side thereof, is used, and the adhesive tape 2a is bonded to the base sheet 1, and projects from the side edge portion of the base sheet 1 extending in the longitudinal direction of this base sheet 1. Therefore, the sheathed wire-covering sheets of the invention can be easily produced, and besides the production cost thereof can be reduced.

Although the preferred embodiments of the sheathed wire-covering sheets of the invention have been described above, these have been given as examples of the invention, and the invention is not limited to these preferred embodiments, and various modifications can be made without departing from the subject matter of the invention.

Figure 10:
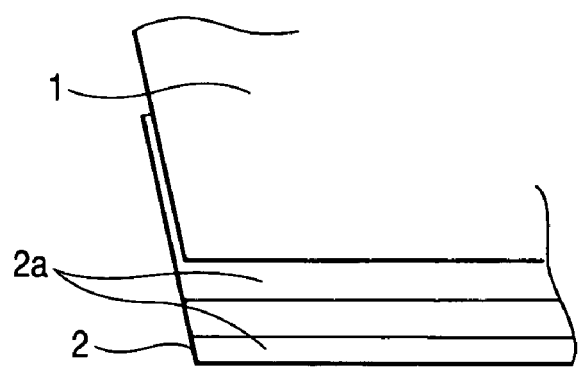
FIG. 10 is a perspective view of a sheathed wire-covering sheet of the invention using a modified adhesive tape.

For example, in the above embodiments, although the adhesive tape (or tapes) 2, having the adhesive surface 2a formed on one side thereof, is used, there can be used an adhesive tape 2 having a plurality of (two in FIG. 10) narrow elongate adhesive surfaces 2a formed on one side thereof as shown in FIG. 10.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-321766 filed on Nov. 7, 2005, the contents of which are incorporated herein for reference.

What is claimed is:

1. A wire harness, comprising:
   a covering sheet for being wound on a sheathed wire, said covering sheet including:
   a base sheet that has a strip shape which includes two opposite side edge portion; and
   an adhesive tape comprising:
   a substrate which is separate from the base sheet;
   an adhesive surface formed only on one side of the substrate; and
   a non-adhesive surface formed on the other side of the substrate,
   wherein the base sheet has a length and a width;
   wherein the adhesive tape is greater in width than the base sheet; and
   wherein the adhesive tape is bonded to the base sheet so as to project in predetermined amounts past both of the opposite side edge portions of the base sheet, respectively; and
   a bundle of sheathed wires around which the covering sheet is wound,
   wherein one end of the adhesive surface of the adhesive tape is bonded to the bundle of sheathed wires, and the other end of the adhesive surface of the adhesive tape is bonded to the non-adhesive surface of the adhesive tape.

2. The wire harness according to claim 1,
   wherein the adhesive tape is bonded to a first side edge portion of the base sheet so as to project past the first side edge portion of the base sheet in either a lengthwise or a widthwise direction of the base sheet,
   wherein a second side edge portion of the base sheet extends from the first side edge portion and is connected to the first side edge portion at a corner; and
   wherein an alignment portion, which aids in aligning one distal end of the second side edge portion relative to the other distal end of the second side edge portion when the covering sheet is wound on the sheathed wire, is formed on at least the first side edge portion of the base sheet and is located at a distance from distal ends of the first side edge portion.

3. The wire harness according to claim 2, wherein the alignment portion includes a mountain portion and a valley portion which are alternately formed.

4. The wire harness according to claim 2, wherein the alignment portion includes a mark formed on at least the first side edge portion of the base sheet.

* * * * *